United States Patent
Kutter et al.

(10) Patent No.: US 11,292,941 B2
(45) Date of Patent: Apr. 5, 2022

(54) ADHESIVE TAPE FOR WRAPPING ELONGATE MATERIAL SUCH AS ESPECIALLY CABLE HARNESSES AND METHOD FOR WRAPPING

(71) Applicant: tesa SE, Norderstedt (DE)

(72) Inventors: Alexander Kutter, Hamburg (DE);
Lars Guldbrandsen, Barsbüttel (DE);
Lars Macketanz, Hamburg (DE);
Patrick Kerep, Hamburg (DE)

(73) Assignee: tesa SE, Norderstedt (DE)

( * ) Notice: Subject to any disclaimer, the term of this patent is extended or adjusted under 35 U.S.C. 154(b) by 192 days.

(21) Appl. No.: 16/544,997

(22) Filed: Aug. 20, 2019

(65) Prior Publication Data
US 2020/0056070 A1 Feb. 20, 2020

(30) Foreign Application Priority Data
Aug. 20, 2018 (DE) .................... 10 2018 213 969.5

(51) Int. Cl.
*C09J 7/21* (2018.01)
*C09J 7/22* (2018.01)
*C09J 7/38* (2018.01)

(52) U.S. Cl.
CPC . *C09J 7/21* (2018.01); *C09J 7/22* (2018.01); *C09J 7/38* (2018.01); *C09J 2203/302* (2013.01);
(Continued)

(58) Field of Classification Search
CPC ......... C09J 7/21; C09J 7/22; C09J 7/38; C09J 2203/302; C09J 2400/263; C09J 2301/204;
(Continued)

(56) References Cited

U.S. PATENT DOCUMENTS 5,106,384 A * 4/1992 Polski .................. C09J 7/20
604/390
6,432,529 B1 8/2002 Harder et al.
(Continued)

FOREIGN PATENT DOCUMENTS

DE 43 13 008 C1 11/1994
DE 197 32 958 A1 2/1999
(Continued)

OTHER PUBLICATIONS

Expanded European Search Report for EP 19189373.4 dated Jan. 24, 2020.

*Primary Examiner* — Patricia L. Nordmeyer
(74) *Attorney, Agent, or Firm* — Norris McLaughlin, P.A.

(57) ABSTRACT

The invention pertains to an adhesive tape, more particularly for wrapping elongate material such as cable harnesses in a motor vehicle, comprising a carrier having a top side and a bottom side, the carrier, based on the cross direction, having a width $B_T$, there being provided, on at least one long edge on the bottom side of the carrier, a strip of adhesive which has a width $B_K$ of at least 3 mm and at most 30% of the width $B_T$, characterized in that as well as the strip of adhesive on the bottom side of the carrier, there is at least one polymer strip which extends over a width $B_P$ of at least 60%, preferably 75%, more preferably 90%, very preferably 100%, of the residual width $B_{RB}$—not coated with the strip of adhesive—of the carrier.

13 Claims, 5 Drawing Sheets

(52) U.S. Cl.
CPC ........ *C09J 2400/263* (2013.01); *Y10T 428/14* (2015.01)

(58) Field of Classification Search
CPC ....... C09J 2301/21; C09J 7/30; Y10T 428/14; H01B 13/26; H01B 7/26
See application file for complete search history.

(56) References Cited

U.S. PATENT DOCUMENTS

| | | |
|---|---|---|
| 6,541,707 B2 | 4/2003 | Külper et al. |
| 6,613,870 B1 | 9/2003 | Harder et al. |
| 6,936,553 B2 | 8/2005 | von Samson-Himmelstjerna |
| 7,132,028 B1 | 11/2006 | Wahlers-Schmidlin et al. |
| 7,279,541 B2 | 10/2007 | Centner et al. |
| 7,282,250 B2 | 10/2007 | Musahl et al. |
| 9,252,583 B2 | 2/2016 | Wahlers-Schmidlin et al. |
| 9,725,622 B2 | 8/2017 | Korthals et al. |
| 2002/0053392 A1 | 5/2002 | Lodde |
| 2002/0125037 A1 | 9/2002 | Kulper et al. |
| 2003/0068945 A1 | 4/2003 | von Samson-Himmelstjerna |
| 2004/0097638 A1 | 5/2004 | Centner et al. |
| 2004/0253889 A1 | 12/2004 | Mundt |
| 2005/0115664 A1 | 6/2005 | Musahl et al. |
| 2006/0231192 A1 | 10/2006 | Wahlers-Schmidlin et al. |
| 2007/0071976 A1 | 3/2007 | Wahlers-Schmidlin et al. |
| 2012/0279637 A1 | 11/2012 | Siebert et al. |
| 2012/0282836 A1 | 11/2012 | Korthals et al. |
| 2012/0282837 A1 | 11/2012 | Korthals et al. |
| 2014/0044960 A1 | 2/2014 | Günzler et al. |
| 2016/0032150 A1 | 2/2016 | Günzler et al. |
| 2016/0333229 A1 | 11/2016 | Korthals et al. |
| 2016/0333230 A1 | 11/2016 | Korthals et al. |
| 2019/0157081 A1 | 5/2019 | Zhao |

FOREIGN PATENT DOCUMENTS

| | | |
|---|---|---|
| DE | 198 07 752 A1 | 8/1999 |
| DE | 100 36 805 A1 | 2/2002 |
| DE | 100 11 788 A1 | 3/2002 |
| DE | 102 29 527 A1 | 1/2004 |
| DE | 10 2011 005 200 A1 | 9/2012 |
| DE | 20 2017 1 07 748 U1 | 1/2018 |
| EP | 0 578 151 A1 | 1/1994 |
| EP | 1 300 452 A2 | 4/2003 |
| EP | 1 312 097 A1 | 5/2003 |
| EP | 1 378 527 A1 | 1/2004 |
| EP | 1 448 744 B1 | 12/2005 |
| EP | 2463347 A2 | 6/2012 |
| EP | 2 520 627 A1 | 11/2012 |
| EP | 2 520 628 A1 | 11/2012 |
| EP | 2 520 629 A1 | 11/2012 |
| EP | 2 522 705 A1 | 11/2012 |
| EP | 2522705 A1 | 11/2012 |
| EP | 2 695 926 A1 | 2/2014 |
| JP | H 08 259911 A | 10/1996 |
| JP | 2001 335756 A | 12/2001 |
| JP | 2019 149539 A | 9/2019 |
| WO | 2006/108871 A1 | 10/2006 |
| WO | WO 2012/048912 A1 | 4/2012 |
| WO | WO 2017/05534 A1 | 5/2017 |

\* cited by examiner

ADHESIVE TAPE FOR WRAPPING ELONGATE MATERIAL SUCH AS ESPECIALLY CABLE HARNESSES AND METHOD FOR WRAPPING

This application claims priority of German Patent Application No. 10 2018 213 969.5, filed Aug. 20, 2018, the entire contents of which are incorporated herein by reference.

The invention pertains to an adhesive tape for wrapping elongate material such as, in particular, cable harnesses in motor vehicles, and to methods for wrapping.

Coverings for the wrapping of elongate material are used for example in order to envelop, in particular, cables, leads, and also, possibly, plugs in motor vehicles and protect them from—for example—scuffing exposures. In actual fact, such coverings and wrappings produced using them, or lengthwise wraps, can be used to bandage not only electrical cables but also, generally, hoses and pipes.

DE 197 32 958 A1 discloses an adhesive tape for wrapping elongate material such as cable harnesses or plastic profiles, which has a tape-like carrier bounded by two lateral edges and provided at least on one side with a self-adhesive layer consisting of a pressure-sensitive adhesive. The chemical composition of the pressure-sensitive adhesive is such that, under gentle applied pressure on two adhesive layers lying one above the other, the interfaces are dissolved and the adhesive layers coalesce completely to form a homogeneous pressure-sensitive adhesive compound.

The invention represented here further embraces a method for wrapping the elongate material. According to that method, the elongate material is positioned lengthways, in the region of a section of the adhesive tape, on a side of a tape-like carrier of the adhesive tape that is provided with a self-adhesive layer, and thereafter the adhesive tape is bonded in such a way that at least two adhesive regions of the tape-like carrier are stuck to one another, on the side provided with the adhesive layer, in such a way that interfaces of the adhesive layer dissolve to form a homogeneous compound.

The result is therefore a pennant which protrudes from the wrapped material and which, especially under the restricted space conditions in automotive construction, is highly undesirable and harbours the potential risk that when the cable harness is drawn through restricted apertures or passages, in the bodywork, for example, the wrap will remain hanging and will tear off, or at least will damage the envelopment. This is something to be avoided.

DE 100 36 805 A1 discloses a wrap for wrapping elongate material with a preferably textile covering, in which, on at least one edge region of the covering that is narrow in comparison to the width of the covering, there is a self-adhesive tape which is bonded on the covering in such a way that the adhesive tape extends over one of the long edges of the covering.

In a first advantageous embodiment of the invention, the wrap, on an edge region of the covering that is narrow in comparison to the width of the covering, has a second self-adhesive tape, which is bonded on the covering in such a way that the adhesive tape extends over the other of the two long edges of the covering.

Optimized embodiments thereof are disclosed in EP 1 312 097 A1. Ongoing developments are likewise set out in EP 1 300 452 A2, DE 102 29 527 A1 and WO 2006 108 871 A1.

If a cable loom is to be wrapped with a product of the kind known, for example, from DE 100 36 805 A1, one of the long edges of the product is fixed on the cable loom in an axial direction, with an adhesive strip or an adhesive tape which is part of the product, for example. The product is subsequently guided in a circular movement around the cable loom, so that the cable loom becomes wrapped by the product.

Lastly, the other long edge of the product is fastened on the cable loom, again by means of an adhesive tape, for example. When the cable loom is fully wrapped, the second long edge is fixed on the product itself.

In the event of a desire for improved protection of the cable loom or improved damping thereof, the cable loom may also be doubly wrapped, with the product being guided two times in a circular form around the cable loom. In this way, there are two plies of the product, which wrap the cable loom.

DE 20 2017 107 748 U1 discloses a covering for wrapping elongate material, more particularly for producing a lengthwise wrap for cables in motor vehicles, having a carrier and having at least two closure strips which are disposed on a top side and/or bottom side of the carrier and which are composed of an adhesive. The closure strips run along respective long edges of the carrier and between them and/or next to them they define an uncoated free region.

The testing and classifying of adhesive tapes for cable wrapping is accomplished in the motor vehicle industry according to extensive bodies of standards, such as, for example, LV 312-1 "Protective systems for wire harnesses in motor vehicles, adhesive tapes; test guideline" (October 2009), as a joint standard of the companies Daimler, Audi, BMW and Volkswagen, or the Ford specification ES-XU5T-1A303-aa (revised version September 2009) "Harness Tape Performance Specification". Below, these standards are referred to in abbreviated form as LV 312 and Ford specification, respectively.

Noise suppression, abrasion resistance and also the temperature stability of an adhesive tape are determined on the basis of defined test constructions and test methods, as described comprehensively in LV 312.

It is an object of the invention to provide an adhesive tape which enables the particularly simple, inexpensive and rapid wrapping of elongate material such as cable harnesses in motor vehicles, and that achieves in particular a high abrasion resistance in conjunction with low production costs.

This object is achieved by means of an adhesive tape as recorded in the main claim. Dependent claims provide advantageous onward developments of the adhesive tape, methods for using the adhesive tape, and a material wrapped with the adhesive tape of the invention.

The invention accordingly relates to an adhesive tape, more particularly for wrapping elongate material such as cable harnesses in a motor vehicle, comprising a carrier having a top side and a bottom side, the carrier, based on the cross direction, having a width $B_T$, there being provided, on at least one long edge on the bottom side of the carrier, a strip of adhesive which has a width $B_K$ of at least 3 mm and at most 30% of the width $B_T$.

As well as the strip of adhesive on the bottom side of the carrier, there is at least one polymer strip which extends over a width $B_P$ of at least 60%, preferably 75%, more preferably 90%, very preferably 100%, of the residual width $B_{RB}$—not coated with the strip of adhesive—of the carrier.

The matter of which is the top side or the bottom side of the carrier is in principle an arbitrary choice.

According to a first preferred embodiment, there is provided, on each of both long edges on the bottom side of the carrier, a strip of adhesive, said strips having a width $B_K$ of at least 3 mm and of at most 30% of the width $B_T$, there being present, between the strips of adhesive on the bottom side of the carrier, at least one polymer strip which extends over a width $B_P$ of at least 60%, preferably 75%, more preferably 90%, very preferably 100%, of the residual width $B_{RB}$—not coated with the strip of adhesive—of the carrier.

According to a further preferred embodiment, the strip or strips of adhesive have a width $B_K$ of at least 3 mm and of at most 10%, preferably of at most 20%, more preferably of at most 25% of the width $B_T$.

Preferably, the strip or strips of adhesive each finish flush with the long edge or long edges of the carrier.

A particularly preferred variant is that wherein the sum of the width $B_K$ of the strip or strips of adhesive and of the width $B_P$ of the polymer strip corresponds to the width $B_T$ of the carrier.

The strip or strips of adhesive can also be applied to the carrier with an offset having a width $B_{VS}$ of up to 5 mm in cross direction. The offset is advantageously narrower than the strip of adhesive itself.

According to one particularly advantageous embodiment of the adhesive tape, the width $B_K$ of the strips of adhesive is at least 10 mm, preferably at least 15 mm and/or at maximum at most 25% of the width $B_T$, preferably at most 10% of the width $B_T$.

With further preference the width $B_K$ of the strips of adhesive is between 5 and 40 mm, more preferably between 10 and 30 mm.

With further preference the width of one strip of adhesive $B_{K1}$ is smaller by a factor of 0.5 to 0.8, preferably 0.6 to 0.75, than the width of the other strip of adhesive $B_{K2}$.

The strip or strips of adhesive, according to a further advantageous embodiment of the invention, have a thickness of 40 to 300 μm, preferably 60 to 200 μm, more preferably 60 to 140 μm.

The strip or strips of adhesive, according to a further advantageous embodiment of the invention, have a coat weight of 40 to 300 g/m², preferably 60 to 200 g/m², more preferably 60 to 140 g/m².

With further preference the thickness or the coat weight of one, more particularly the narrower, strip of adhesive is smaller by a factor of 0.5 to 0.8, preferably 0.6 to 0.75, than the thickness or the coat weight of the other strip of adhesive.

According to one particularly preferred variant of the invention, the polymer strip extends over 100% of the residual width $B_{RB}$—not coated with the strips of adhesive—of the carrier.

In this case, the edges of the polymer strip lie flush (that is, without an intervening space) to one edge or to each edge, respectively, of the strip or strips of adhesive.

The polymer strip, according to one further advantageous embodiment of the invention, like the adhesive strips, has a thickness of 40 to 300 μm, preferably 60 to 200 μm, more preferably 60 to 140 μm.

The polymer strip, according to one further advantageous embodiment of the invention, like the adhesive strips has a (area-based) coat weight of 10 to 300 g/m², preferably 40 to 200 g/m², more preferably 60 to 140 g/m².

It is preferred, further, if the thickness and/or the (area-based) coat weight of the polymer strip exceeds the thickness and/or the (area-based) coat weight of the strip or strips of adhesive by at maximum 20%, and more preferable if the thickness and/or the (area-based) coat weight of the polymer strip and the thickness and/or the (area-based) coat weight of the strip or strips of adhesive are identical.

With further preference the thicknesses of the two strips of adhesive and also of the polymer strip are identical.

The polymer strip, according to one preferred embodiment, is non-tacky, thus having preferably a peel adhesion on steel of less than 0.7 N/cm after 30 minutes of peel increase.

The glass transition point $T_g$, according to one preferred embodiment, is below 0° C.

The molecular weight $m_W$ of the polymer strip, according to one preferred embodiment, is greater than 10,000 g/mol.

With further preference, all three parameters are met simultaneously.

With further preference, the polymer strip is a non-tacky, polymeric material composed of polyacrylate, polyolefin, polyester, natural rubber, synthetic rubber or polyurethane.

The known fillers such as, for example, silicon dioxide, glass (ground or in the form of spheres, as solid or hollow spheres), microballoons, aluminium oxides, zinc oxides, calcium carbonates, titanium dioxides, carbon blacks, silicates, chalk and, in particular, flame retardants may find use in the polymer strip.

The polymer strip may be produced and processed from solution, from dispersion, and also from the melt. Preferred production and processing methods avoid lamination of the polymer strip onto the carrier.

The width $B_T$ of the carrier is preferably between 20 and 500 mm, more preferably between 40 to 200 mm, more preferably between 60 to 130 mm.

It is then advantageous if the carrier has a basis weight of 30 to 250 g/m², preferably 50 to 200 g/m², more preferably 60 to 150 g/m².

In the text below, preferred parameter combinations are specified for a number of embodiments of the invention, without wishing thereby to limit the invention.

In the case of a woven fabric-based carrier, the carrier and the two strips of adhesive preferably have the following values:
  basis weight of the carrier: 50 to 200 g/m², preferably 50 to 150 g/m²
  thickness of the strips of adhesive: 40 to 200 μm, preferably 60 to 140 μm
  width $B_K$ of the strips of adhesive: 5 to 40 mm, preferably 10 to 30 mm
  width $B_P$ of 100% of the residual width $B_{RB}$—not coated with the strips of adhesive—of the carrier
  thickness of the polymer strip identical to thickness of the strip of adhesive In the case of a nonwoven fabric-based carrier, the carrier and the two strips of adhesive preferably have the following values:
  basis weight of the carrier: 30 to 250 g/m², preferably 45 to 200 g/m², more preferably 60 to 200 g/m²
  thickness of the strips of adhesive: 60 to 300 μm, preferably 120 to 280 μm
  width $B_K$ of the strips of adhesive: 5 to 40 mm, preferably 10 to 30 mm
  width $B_P$ of 100% of the residual width $B_{RB}$—not coated with the strips of adhesive—of the carrier
  thickness of the polymer strip identical to thickness of the strip of adhesive In the case of a knitted fabric-based carrier, the carrier and the two strips of adhesive preferably have the following values:
  basis weight of the carrier: 50 to 250 g/m², preferably 50 to 200 g/m²
  thickness of the strips of adhesive: 40 to 200 μm, preferably 60 to 140 μm
  width $B_K$ of the strips of adhesive: 5 to 40 mm, preferably 10 to 30 mm width $B_P$ of 100% of the residual width $B_{RB}$—not coated with the strips of adhesive—of the carrier thickness of the polymer strip identical to thickness of the strip of adhesive With the values stated, the resulting diameters of the hose produced from the adhesive tape are those claimed as being preferred, of 5 to 50 mm, more preferably 10 to 30 mm.

According to a further preferred variant of the invention, to the at least one strip of adhesive on the bottom side of the carrier, a further (third) strip of adhesive is provided on the top side of the carrier. This third adhesive strip functions in general as a fixing strip. Moreover, the third adhesive strip, as viewed in the cross section of the carrier, is in the region of the polymer strip between and/or alongside the one strip or the two strips of adhesive on the bottom side of the carrier.

The adhesive tape is used preferably for wrapping elongate material such as cable harnesses in particular, with the elongate material being enveloped in an axial direction by the adhesive tape.

Where a cable loom is to be jacketed with an adhesive tape of the invention, this is done by fixing one of the long edges of the adhesive tape on the cable loom in an axial direction, using the first strip of adhesive, for example. Subsequently, the product is guided in a circular motion around the cable loom, so that the cable loom becomes wrapped by the adhesive tape. Lastly, the other long edge of the adhesive tape is fixed on the cable loom, by means of the second strip of adhesive, for example. When the cable loom is completely wrapped, the second long edge is fixed on the adhesive tape itself.

If there is a desire for enhanced protection of the cable loom or for improved damping, the cable loom may also be doubly wrapped, with the adhesive tape being guided two times circularly around the cable loom. In this way, two plies of the product are formed, which jacket the cable loom.

Also embraced by the concept of the invention, lastly, is an elongate material such as, in particular, a cable harness that is jacketed with the adhesive tape of the invention, and also a vehicle comprising a cable loom jacketed in accordance with the invention.

In accordance with one preferred embodiment of the invention, the carrier is in a single-ply configuration. With further preference, the top side of the carrier is uncoated.

Suitable carriers include in principle all carrier materials, preferably textile carriers and more preferably woven fabrics, more particularly woven polyester fabrics.

In principle it is possible to use all known textile carriers such as knitted fabrics, scrims, tapes, braids, tufted textiles, felts, woven fabrics (encompassing plain weave, twill and satin weave), knitted fabrics (encompassing warp knits and other knits) or nonwoven webs, the term "nonwoven web" comprehending at least sheetlike textile structures in accordance with EN 29092 (1988) and also stitchbonded webs and similar systems.

It is likewise possible to use woven and knitted spacer fabrics with lamination.

Spacer fabrics are mat-like layer structures comprising a cover layer of a fibre or filament web, an underlayer and individual retaining fibres or bundles of such fibres between these layers, these fibres being distributed over the area of the layer structure, being needled through the particle layer and joining the cover layer and the underlayer to one another.

The retaining fibres needled through the particle layer hold the cover layer and the underlayer at a distance from one another and are joined to the cover layer and the underlayer.

Nonwovens contemplated include, in particular, consolidated staple fibre webs, but also filament webs, meltblown webs and spunbonded webs, which generally require additional consolidation. Possible consolidation methods known for webs include mechanical, thermal and chemical consolidation. If with mechanical consolidations the fibres are held together purely mechanically usually by entanglement of the individual fibres, by the interlooping of fibre bundles or by the stitching-in of additional threads, it is possible by thermal and by chemical techniques to obtain adhesive (with binder) or cohesive (binderless) fibre-fibre bonds. Given appropriate formulation and an appropriate process regime, these bonds may be restricted exclusively, or at least predominantly, to fibre nodal points, so that a stable, three-dimensional network is formed while nevertheless retaining the relatively loose, open structure in the web.

Webs which have proved to be particularly advantageous are those consolidated in particular by overstitching with separate threads or by interlooping.

Consolidated webs of this kind are produced for example on stitchbonding machines of the "Malimo" type from the company Karl Mayer, formerly Malimo, and can be obtained from companies including Techtex GmbH. A Malifleece is characterized in that a cross-laid fibre web is consolidated by the formation of loops from fibres of the web.

The carrier used may also be a web of the Kunit or Multiknit type. A Kunit web is characterized in that it originates from the processing of a longitudinally oriented fibre web to form a sheetlike structure which has loops on one side and has loop feet or pile fibre folds on the other side, but possesses neither threads nor prefabricated sheet-like structures. A web of this kind as well has been produced for a relatively long time, for example on stitchbonding machines of the "Malimo" type from the company Karl Mayer. A further characterizing feature of this web is that, as a longitudinal-fibre web, it is able to absorb high tensile forces in the longitudinal direction. The characteristic feature of a Multiknit web relative to the Kunit web is that the web is consolidated on both the top and bottom sides by virtue of the double-sided needle punching. The starting product used for a Multiknit is generally one or two single-sidedly interlooped pile fibre nonwovens produced by the Kunit process. In the end product, both top sides of the nonwovens are shaped by means of interlooped fibres to form a closed surface, and are joined to one another by fibres which stand almost perpendicularly. An additional possibility is to introduce further needlable sheetlike structures and/or scatterable media.

Finally, stitchbonded webs as a precursor are also suitable for forming a covering of the invention and an adhesive tape of the invention. A stitchbonded web is formed from a nonwoven material having a large number of stitches extending parallel to one another. These stitches are brought about by the stitching-in or stitchbonding of continuous textile threads. For this type of web, stitchbonding machines of the "Malimo" type from the company Karl Mayer are known.

Also particularly suitable are needlefelt webs. In a needlefelt web, a tuft of fibres is made into a sheetlike structure by means of needles provided with barbs. By alternate introduction and withdrawal of the needles, the material is consolidated on a needle bar, with the individual fibres interlooping to form a firm sheetlike structure. The number and configuration of the needling points (needle shape, penetration depth, double-sided needling) determine the thickness and strength of the fibre structures, which are in general lightweight, air-permeable and elastic.

Also particularly advantageous is a staple fibre web which is mechanically preconsolidated in the first step or is a wet-laid web laid hydrodynamically, in which between 2% and 50% by weight of the web fibres are fusible fibres, more particularly between 5% and 40% by weight of the web fibres.

A web of this kind is characterized in that the fibres are laid wet or, for example, a staple fibre web is preconsolidated by the formation of loops from fibres of the web by needling, stitching or air-jet and/or water-jet treatment.

In a second step, thermofixing takes place, with the strength of the web being increased again by the melting, or partial melting, of the fusible fibres.

For the utilization of nonwovens in accordance with the invention, the adhesive consolidation of mechanically preconsolidated or wet-laid webs is of particular interest, it being possible for said consolidation to take place by way of the addition of binder in solid, liquid, foamed or paste-like form. A great diversity of theoretical presentation forms is possible: for example, solid binders as powders for trickling in; as a sheet or as a mesh; or in the form of binding fibres. Liquid binders may be applied as solutions in water or organic solvents, or as a dispersion. For adhesive consolidation, binding dispersions are predominantly selected: thermosets in the form of phenolic or melamine resin dispersions, elastomers as dispersions of natural or synthetic rubbers or, usually, dispersions of thermoplastics such as acrylates, vinyl acetates, polyurethanes, styrene-butadiene systems, PVC, and the like, and also copolymers thereof. Normally the dispersions are anionically or nonionically stabilized, although in certain cases cationic dispersions may also be of advantage.

The binder may be applied in a manner which is in accordance with the prior art and for which it is possible to consult, for example, standard works of coating or of nonwoven technology such as "Vliesstoffe" (Georg Thieme Verlag, Stuttgart, 1982) or "Textiltechnik-Vliesstofferzeugung" (Arbeitgeberkreis Gesamttextil, Eschborn, 1996).

For mechanically preconsolidated webs which already possess sufficient composite strength, the single-sided spray application of a binder is appropriate for producing specific changes in the surface properties.

Such a procedure not only is sparing in its use of binder but also greatly reduces the energy requirement for drying. Since no squeeze rolls are required and the dispersions remain predominantly in the upper region of the nonwoven, unwanted hardening and stiffening of the web can be largely prevented.

For sufficient adhesive consolidation of the web carrier, the addition of binder in the order of magnitude of 1% to 50%, more particularly 3% to 20%, based on the weight of the fibre web, is generally required.

The binder may be added as early as during the manufacture of the web, in the course of mechanical preconsolidation, or else in a separate process step, which may be carried out in-line or off-line. Following the addition of binder, it is necessary temporarily to generate a condition for the binder in which the binder becomes adhesive and adhesively connects the fibres—this may be achieved during the drying, for example, of dispersions, or else by means of heating, with further possibilities for variation existing by way of areal or partial application of pressure. The binder may be activated in known drying tunnels, given an appropriate selection of binder, or else by means of infra-red radiation, UV radiation, ultrasound, high-frequency radiation or the like. For the subsequent end use it is sensible, though not absolutely necessary, for the binder to have lost its tack following the end of the web production process. It is advantageous that, as a result of thermal treatment, volatile components such as fibre assistants are removed, giving a web having favourable fogging values, so that when a low-fogging adhesive is used, it is possible to produce an adhesive tape having particularly favourable fogging values; accordingly, the covering as well has a very low fogging value.

By fogging (see DIN 75201 A) is meant the effect where, under unfavourable conditions, compounds of low molecular mass may outgas from the adhesive tapes and condense on cold parts. As a result of this it is possible, for example, for the view through the windscreen to be adversely affected.

A further special form of adhesive consolidation involves activating the binder by partial dissolution or partial swelling. In this case it is also possible in principle for the fibres themselves, or admixed speciality fibres, to take over the function of the binder. Since, however, such solvents are objectionable on environmental grounds, and/or are problematic in their handling, for the majority of polymeric fibres, this process is not often employed.

Advantageously and at least in regions, the carrier may have a single-sidedly or double-sidedly polished surface, preferably in each case a surface polished over the whole area. The polished surface may be chintzed, as elucidated in detail in EP 1 448 744 A1, for example.

Furthermore, the carrier may be compacted by calendering on a roll mill. The two rolls preferably run in opposite directions and at the same peripheral speed, causing the carrier to be pressed and compacted.

If there is a difference in the peripheral speed of the rolls, then the carrier is additionally polished.

The carrier is preferably a woven fabric.

Particularly preferred woven fabrics have the following construction:
- the thread count in the warp is 10 to 60/cm
- the thread count in the weft is 10 to 40/cm
- the warp threads possess a yarn weight of between 40 and 400 dtex, more particularly between 44 and 330 dtex, very preferably of 167 dtex
- the weft threads possess a yarn weight of between 40 and 660 dtex, more particularly between 44 and 400 dtex, very preferably of 167 dtex.

According to a further advantageous embodiment of the invention, the thread count in the warp is 40 to 50/cm, preferably 44/cm.

According to a further advantageous embodiment of the invention, the thread count in the weft is 18 to 22/cm, preferably 20/cm.

According to a further advantageous embodiment of the invention, the woven fabric is a woven polyester fabric. Further possibilities are woven polyamide fabrics, woven viscose fabrics and/or a woven blend fabric comprising the stated materials.

With further preference the thickness of the woven fabric is at most 300 µm, more preferably 170 to 230 µm, very preferably 190 to 210 µm.

According to another advantageous embodiment of the invention, the carrier has a basis weight of up to 200 g/m$^2$, preferably 100 to 150 g/m$^2$.

Preferred carriers are those which result in an adhesive tape in which a tear can be initiated (with relatively little problem) by hand; it is likewise of particular importance for the end use described and for the particularly preferred processing as a wrapping tape for the bundling of cables in motor vehicles.

A cross-direction tearing strength of less than 10 N as determined by the AFERA 4007 standard serves as a criterion for the hand-tearability of the adhesive tape.

Only in the case of very high basis weights or thicknesses on the part of the carriers employed is it possible for the hand-tearability to be absent or limited. In this case, however, perforations may be present in order to optimize the hand-tearability. Perforations may also be provided in adhesive tapes that are hand-tearable per se, in order to improve further the handling qualities by allowing sections of adhesive tape preperforated to an appropriate length to be separated off conveniently.

In this way it is possible to obtain edges between the individual sections that are highly lint-free, and this means that unwanted fraying is avoided.

In order to enable particularly simple operation for the user, the perforations are arranged at regular intervals and/or aligned at right angles to the running direction of the adhesive tape.

The perforations can be produced in a particularly advantageous way either discontinuously, using flat dies or cross-running perforating wheels, or continuously, using rotary systems such as spiked rollers or punch rollers, optionally with the use of a counter-roller (Vulkollan roller) forming the counter-wheel during cutting.

Further possibilities include cutting technologies which are controlled to operate intermittently, such as the use of lasers, ultrasound or high-pressure water jets, for example, and so on. Where, in the case of laser cutting or ultrasound cutting, some of the energy is introduced into the carrier material in the form of heat, it is possible to melt the fibres in the cutting region, thereby very largely preventing disruptive fraying, and producing sharply contoured cut edges. Latter methods are also suitable for obtaining specific cut-edge geometries, such as concave or convex cut edges, for example.

Starting materials for the carrier material for the adhesive tape are more particularly (manmade) fibres (staple fibre or continuous filament) made from synthetic polymers, also called synthetic fibres, made from polyester, polyamide, polyimide, aramid, polyolefin, polyacrylonitrile or glass, (manmade) fibres made from natural polymers such as cellulosic fibres (viscose, Modal, Lyocell, Cupro, acetate, triacetate, Cellulon), such as rubber fibres, such as plant protein fibres and/or such as animal protein fibres and/or natural fibres made of cotton, sisal, flax, silk, hemp, linen, coconut or wool. The present invention, however, is not confined to the materials stated; it is instead possible, as evident to the skilled person without having to take an inventive step, to use a multiplicity of further fibres in order to produce the carrier.

Likewise suitable, furthermore, are yarns fabricated from the fibres specified.

In the case of woven fabrics or scrims, individual threads may be produced from a blend yarn, and thus may have synthetic and natural constituents. Generally speaking, however, the warp threads and the weft threads are each formed of a single kind.

The warp threads and/or the weft threads here may in each case be composed only of synthetic threads or only of threads made from natural raw materials—in other words, of a single kind.

The yarns or threads of the woven fabrics may be in the form of filaments. For the purposes of this invention, a filament refers to a bundle of parallel individual linear fibres/filaments, often also referred to in the literature as a multifilament. This fibre bundle may optionally be given inherent strengthening by torsion, and is then referred to as spun or twisted filaments. Alternatively, the fibre bundle can be given inherent strengthening by entangling using compressed air or water jets. In the text below, for all of these embodiments, only the term "filament" will be used, in a generalizing way.

The filament may be textured or smooth and may have point strengthening or no strengthening.

Texturing refers generally to a procedure in which the filaments are durably crimped. The crimping produces loops which raise the elastic stretchability and also the abrasion resistance.

Preferred material for the carrier comprises polyamide, more preferably polyesters, on account of the outstanding ageing stability and the outstanding media resistance with respect to chemicals and service media such as oil, petrol, antifreeze, and the like. Furthermore, polyester has the advantages that it leads to a very abrasion-resistant and temperature-stable carrier, this being particularly important for the specific use for the bundling of cables in motor vehicles and, for example, in the engine compartment.

Also suitable for the adhesive tape is a carrier material which consists of paper, of a laminate, of a film (for example PP, PE, PET, PA, PU), of foam or of a foamed film.

These non-textile sheetlike materials are especially appropriate when specific requirements necessitate such a modification of the invention. Films are generally thinner in comparison to textiles, for example, and, as a result of the imperforate layer, offer additional protection against penetration by chemicals and service fluids such as oil, petrol, antifreeze and the like into the actual cable area, and can be substantially adapted to requirements by an appropriate selection of the material from which they are constructed. With polyurethanes or polyolefin copolymers, for example, flexible and elastic carriers can be produced; with polyester and polyamides, good abrasion resistance and temperature stability are achieved.

Foams or foamed films, on the other hand, possess the qualities of more substantial space filling and of good soundproofing—where a length of cable is laid, for example, in a duct-like or tunnel-like area in the vehicle, a jacketing tape of appropriate thickness and soundproofing can prevent disruptive flapping and vibration from the outset.

Preference is given to a laminate of the textile carrier and of polymeric layer or film applied at least to one side of the textile carrier. It is additionally possible for films and/or polymeric layers to be applied on the top side and the bottom side of the textile carrier.

Application may take place by lamination or by extrusion.

In a preferred variant, a nonwoven web is provided on its bottom side with a film, which on the other side is furnished with a pressure-sensitive adhesive.

Suitable material for films or polymeric material comprises films such as, for example, PP, PE, polyester, PA, PU or PVC. The films themselves may consist in turn of a plurality of individual plies, as for example of plies which are coextruded to form film.

Preference is given to polyolefins, but copolymers of ethylene and polar monomers such as styrene, vinyl acetate, methyl methacrylate, butyl acrylate or acrylic acid are also included. It may be a homopolymer such as HDPE, LDPE, MDPE or a copolymer of ethylene with a further olefin such as propene, butene, hexene or octene (for example LLDPE, VLDPE). Also suitable are polypropylenes (for example polypropylene homopolymers, random polypropylene copolymers or polypropylene block copolymers).

The film preferably has a thickness of 12 μm to 100 μm, more preferably 28 to 50 μm, more particularly 35 μm.

The film may be coloured and/or transparent.

The strip or strips of adhesive are used to fix the adhesive tape during the wrapping procedure.

The strip or strips of adhesive may consist of strips of pure adhesive composition. They may also consist of a double-sidedly self-adhesive tape.

To produce an adhesive tape from the carrier, any known system of adhesive compositions may be employed. Besides adhesives based on natural or synthetic rubber, it is possible in particular to use silicone adhesives and also polyacrylate adhesives.

The adhesive applied to the carrier material is preferably a pressure-sensitive adhesive (PSA), in other words an adhesive which even under relatively weak applied pressure allows durable bonding to virtually all substrates and which after use can be detached from the substrate again substantially without residue. A PSA has a permanently pressure-sensitive adhesive effect at room temperature, in other words possessing sufficiently low viscosity and a high tack, and so the surface of the bonding substrate in question is wetted even with low applied pressure. The bondability of the adhesive derives from its adhesive properties, and the redetachability from its cohesive properties.

PSAs may be viewed as liquids of extremely high viscosity with an elastic component. PSAs accordingly have particular, characteristic viscoelastic properties which result in the permanent inherent tack and adhesiveness.

A characteristic of PSAs is that when they are mechanically deformed, there are processes of viscous flow and there is also development of elastic forces of resilience. The two processes have a certain relationship to one another in terms of their respective proportion, in dependence not only on the precise composition, the structure and the degree of crosslinking of the respective PSA, but also on the rate and duration of the deformation, and on the temperature.

The proportional viscous flow is necessary for the attainment of adhesion. Only the viscous components, brought about by macromolecules with relatively high mobility, permit effective wetting and effective flow onto the substrate where bonding is to take place. A high viscous flow component results in high tack (also referred to as surface stickiness) and hence often also in a high peel adhesion.

Highly crosslinked systems, crystalline polymers or polymers with glass-like solidification, lack flowable components and are therefore in general devoid of pressure-sensitive adhesiveness or at least possess only little pressure-sensitive adhesiveness.

The proportional elastic forces of resilience are necessary for the attainment of cohesion. They are brought about, for example, by very long-chain macromolecules with a high degree of coiling, and also by physically or chemically crosslinked macromolecules, and they permit the transmission of the forces that act on an adhesive bond. They enable an adhesive bond to withstand a long-term load acting on it, in the form of a long-term shearing load, for example, to a sufficient extent over a relatively long time period.

One adhesive which has shown itself to be particularly suitable is a low molecular mass, pressure-sensitive, acrylate hotmelt adhesive, as stocked under the acResin UV name by BASF. This adhesive, with a low K value, acquires its practical properties by means of a concluding crosslinking operation initiated chemically by radiation.

Further outstandingly suitable adhesives are described in EP 2 520 627 A1, EP 2 522 705 A1, EP 2 520 628 A1, EP 2 695 926 A1 and EP 2 520 629 A1.

Particularly preferred is a pressure-sensitive adhesive in the form of a dried polymer dispersion, the polymer having been synthesized from:
(a) 95.0 to 100.0 wt % of n-butyl acrylate and/or 2-ethylhexyl acrylate
(b) 0.0 to 5.0 wt % of an ethylenically unsaturated monomer having an acid or acid anhydride function.

The polymer consists preferably of 95.0 to 99.5 wt % of n-butyl acrylate and/or 2-ethylhexyl acrylate and 0.5 to 5 wt % of an ethylenically unsaturated monomer having an acid or acid anhydride function, more preferably of 97.0 or 98.0 to 99.0 wt % of n-butyl acrylate and/or 2-ethylhexyl acrylate and 1.0 to 2.0 wt % or 3 wt % of an ethylenically unsaturated monomer having an acid or acid anhydride function.

Besides the acrylate polymers recited, and besides any residual monomers present, the pressure-sensitive adhesive may additionally be admixed with tackifiers and/or adjuvants such as light stabilizers or ageing inhibitors.

In particular there are no further polymers such as elastomers present in the pressure-sensitive adhesive, meaning that the polymers of the pressure-sensitive adhesive consist only of the monomers (a) and (b) in the proportions indicated.

Monomer (a) is preferably formed by n-butyl acrylate.

Examples of monomers contemplated as (b) advantageously include acrylic acid, methacrylic acid, itaconic acid, maleic acid, fumaric acid and/or maleic anhydride.

Preferred is (meth)acrylic acid of the formula I, (I)

where $R^3$ is =H or $CH_3$, preference is given optionally to using the mixture of acrylic acid or methacrylic acid. Acrylic acid is particularly preferred.

According to one particularly preferred variant, the composition of the polymer is as follows:
(a) 95.0 to 100.0 wt %, preferably 95.0 to 99.5 wt %, more preferably 98.0 to 99.0 wt % of n-butyl acrylate and
(b) 0.0 to 5.0 wt %, preferably 0.5 to 5.0 wt %, more preferably 1.0 to 2.0 wt % of acrylic acid.

The polymer dispersion is prepared by the process of emulsion polymerization of the stated components. Descriptions of this process can be found for example in "Emulsion Polymerization and Emulsion Polymers" by Peter A. Lovell and Mohamed S. El-Aasser—Wiley-VCH 1997—ISBN 0-471-96746-7 or in EP 1 378 527 B1.

During the polymerization it cannot be ruled out that not all of the monomers undergo reaction to form polymers. It is obvious here that the residual monomer content is to be as small as possible.

Preference is given to providing adhesives comprising the polymer dispersion with a residual monomer content of less than or equal to 1 wt %, more particularly less than or equal to 0.5 wt % (based on the mass of the dried polymer dispersion).

A "tackifier resin" is understood, in accordance with the general understanding of the skilled person, to refer to an oligomeric or polymeric resin which raises the autoadhesion (the tack, the inherent adhesiveness) of the PSA by comparison with the PSA that is otherwise identical but contains no tackifier resin.

The use of tackifiers for boosting the peel adhesion values of PSAs is known in principle. This effect also comes about if the adhesive is admixed with up to 15 parts by weight (corresponding to <15 parts by weight), or 5 to 15 parts by weight, of tackifier (based on the mass of the dried polymer dispersion). Preference is given to adding 5 to 12, more preferably 6 to 10, parts by weight of tackifier (based on the mass of the dried polymer dispersion).

Suitability as tackifiers, also referred to as tackifier resins, is possessed in principle by all known classes of compound. Tackifiers are, for example, hydrocarbon resins (for example, polymers based on unsaturated $C_5$ or $C_9$ monomers), terpene phenolic resins, polyterpene resins based on raw materials such as, for example, α- or β-pinene, aromatic resins such as coumarone-indene resins or resins based on styrene or α-methylstyrene such as rosin and its derivatives, for example disproportionated, dimerized or esterified rosin, for example reaction products with glycol, glycerol or pentaerythritol, to name but a few. Preferred resins are those without readily oxidizable double bonds, such as terpene phenolic resins, aromatic resins and very preferably resins produced by hydrogenation, such as, for example, hydrogenated aromatic resins, hydrogenated polycyclopentadiene resins, hydrogenated rosin derivatives or hydrogenated polyterpene resins.

Preferred resins are those based on terpene phenols and rosin esters. Likewise preferred are tackifier resins having a softening point of more than 80° C. according to ASTM E28-99 (2009). Particularly preferred are resins based on terpene phenols and rosin esters having a softening point of more than 90° C. according to ASTM E28-99 (2009). The resins are usefully employed in dispersion form. In that way they can easily be mixed in finely divided form with the polymer dispersion.

Particularly preferred is the variant wherein no tackifier resins at all have been added to the PSA.

Surprisingly and unforeseeably for the skilled person, the absence of tackifier resins from the adhesive tape does not—as the skilled person would have expected—result in inadequate peel adhesion. Surprisingly, furthermore, the flagging behaviour as well is not poorer.

In particular, the PSA is not admixed with the following substances:
hydrocarbon resins (for example polymers based on unsaturated $C_5$ or $C_9$ monomers)
terpene phenolic resins
polyterpene resins based on raw materials such as α- or β-pinene, for example
aromatic resins such as coumarone-indene resins or resins based on styrene or α-methylstyrene such as rosin and its derivatives, for example disproportionated, dimerized or esterified rosin, for example reaction products with glycol, glycerol or pentaerythritol.

On account of their particular suitability as an adhesive for adhesive tapes of automotive cable harnesses, in respect of freedom from fogging, and also of outstanding compatibility with both PVD and PVC-free core insulation, preference is given to solvent-free acrylate hotmelt compounds, of the kind described in more detail in DE 198 07 752 A1 and also in DE 100 11 788 A1.

A suitable adhesive is an acrylate hotmelt-based adhesive having a K value of at least 20, more particularly greater than 30 (measured in each case in 1 wt % solution in toluene, 25° C.) and obtainable by concentrating a solution of such an adhesive to form a system which can be processed as a hotmelt.

The concentrating process may take place in appropriately equipped vessels or extruders; especially in the case of accompanying degassing, a venting extruder is preferred.

One such adhesive is set out in DE 43 13 008 C2. In an intermediate step, the solvent is removed entirely from these acrylate adhesives produced in this way.

The K value here is determined, in particular, in analogy to DIN 53 726.

Additionally, here, further volatile constituents are removed. After coating from the melt, these adhesives have only small residual fractions of volatile constituents. Hence it is possible to adopt all of the monomers/formulas that are claimed in the patent referred to above.

The solution of the adhesive may comprise 5 to 80 wt %, more particularly 30 to 70 wt %, of solvents.

Preference is given to using commercial solvents, particularly low-boiling hydrocarbons, ketones, alcohols and/or esters.

It is preferred, moreover, to use single-screw, twin-screw or multi-screw extruders having one or, in particular, two or more venting units.

The acrylate hotmelt-based adhesive may have had benzoin derivatives incorporated into it by copolymerization, examples being benzoin acrylate or benzoin methacrylate, acrylic or methacrylic esters. Benzoin derivatives of these kinds are described in EP 0 578 151 A.

The acrylate hotmelt-based adhesive may be UV-crosslinked. Other modes of crosslinking are also possible, however, an example being an electron beam crosslinking.

In a further preferred embodiment, self-adhesive compounds used are copolymers of (meth)acrylic acid and esters thereof having 1 to 25 carbons, maleic, fumaric and/or itaconic acid and/or their esters, substituted (meth)acrylamides, maleic anhydride, and other vinyl compounds, such as vinyl esters, more particularly vinyl acetate, vinyl alcohols and/or vinyl ethers.

The residual solvent content ought to be below 1 wt %.

One adhesive which is found to be particularly suitable is a low molecular mass, pressure-sensitive acrylate hotmelt adhesive, of the kind stocked under the name acResin UV or Acronal®, especially acResin 258UV, by BASF. This adhesive with a low K value acquires its practical properties as a result of a concluding crosslinking procedure initiated chemically by radiation.

The adhesive coating likewise preferably consists of an adhesive based on synthetic rubber, more particularly an adhesive comprising at least one vinylaromatic block copolymer and at least one tackifier resin. Typical concentrations of use for the block copolymer lie in a concentration in the range between 30 wt % and 70 wt %, more particularly in the range between 35 wt % and 55 wt %.

Further polymers which may be present are those based on pure hydrocarbons such as, for example, unsaturated polydienes, such as natural or synthetically produced polyisoprene or polybutadiene, chemically substantially saturated elastomers such as, for example, saturated ethylene-propylene copolymers, α-olefin copolymers, polyisobutylene, butyl rubber, ethylene-propylene rubber, and also chemically functionalized hydrocarbons such as, for example, halogen-containing, acrylate-containing or vinyl ether-containing polyolefins, which may replace up to half of the vinylaromatic-containing block copolymers.

Serving as tackifiers are tackifier resins which are compatible with the elastomer block of the styrene block copolymers.

Plasticizing agents typically employed are those such as, for example, liquid resins, plasticizer oils or low molecular mass liquid polymers such as, for example, low molecular mass polyisobutylenes, having molar masses <1500 g/mol (number-average), or liquid EPDM grades.

To all stated types of adhesives it is possible to add further additives in the form of light stabilizers such as, for example, UV absorbers, sterically hindered amines, antiozonants, metal deactivators, processing assistants, and endblock-reinforcing resins.

Fillers such as, for example, silicon dioxide, glass (ground or in the form of spheres, as solid or hollow spheres), microballoons, aluminium oxides, zinc oxides, calcium carbonates, titanium dioxides, carbon blacks, silicates and chalk, to name but a few, and also colour pigments and dyes, and also optical brighteners, may likewise be used.

It is common to add primary and secondary antioxidants to PSAs in order to improve their ageing stability. Primary antioxidants react with oxy and peroxy radicals, which may form in the presence of oxygen, and react with them to form less reactive compounds. Secondary antioxidants reduce hydroperoxides, for example, into alcohols. There is a known synergistic effect between primary and secondary ageing inhibitors, and so the protective effect of a mixture is frequently greater than the sum of the two individual effects.

If the adhesive tape described is to be of low flammability, this quality can be achieved by adding flame retardants to the carrier and/or to the adhesive. These retardants may be organobromine compounds, if required with synergists such as antimony trioxide, although, with regard to the absence of halogen from the adhesive tape, preference will be given to using red phosphorus, organophosphorus compounds, mineral compounds or intumescent compounds such as ammonium polyphosphate, alone or in conjunction with synergists.

The PSAs may be produced and processed from solution, from dispersion and also from the melt. Preferred production and processing methods take place from the melt. For the latter case, suitable production operations encompass both batch processes and continuous processes.

BRIEF DESCRIPTION OF THE DRAWINGS

In the text below, the intention is to elucidate the invention in more detail, referring to a number of figures and also an example, without thereby wishing to impose any unnecessary limitation on the invention.

Figure 1:
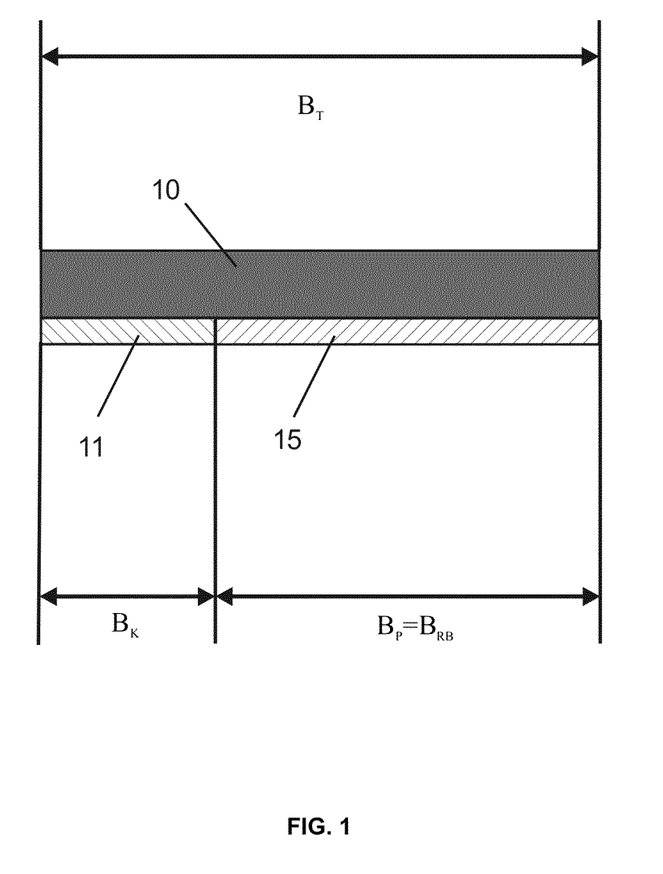
FIG. 1 shows an inventive adhesive tape with a strip of adhesive.

In cross section in FIG. 1 is an inventive adhesive tape having a carrier 10 which has a width $B_T$ (45 mm, for example). On the bottom side of the carrier 10 is a strip 11 of an adhesive with a width $B_K$ of 10 mm and hence of approximately 22% of the width $B_T$.

Beside the strip 11 of adhesive on the bottom side of the carrier is a polymer strip 15, which extends over a width $B_P$ of 100% of the residual width $B_{RB}$, not coated with the strip 11 of adhesive, of the carrier; in other words, $B_P$ is equal to $B_{RB}$.

Figure 2:
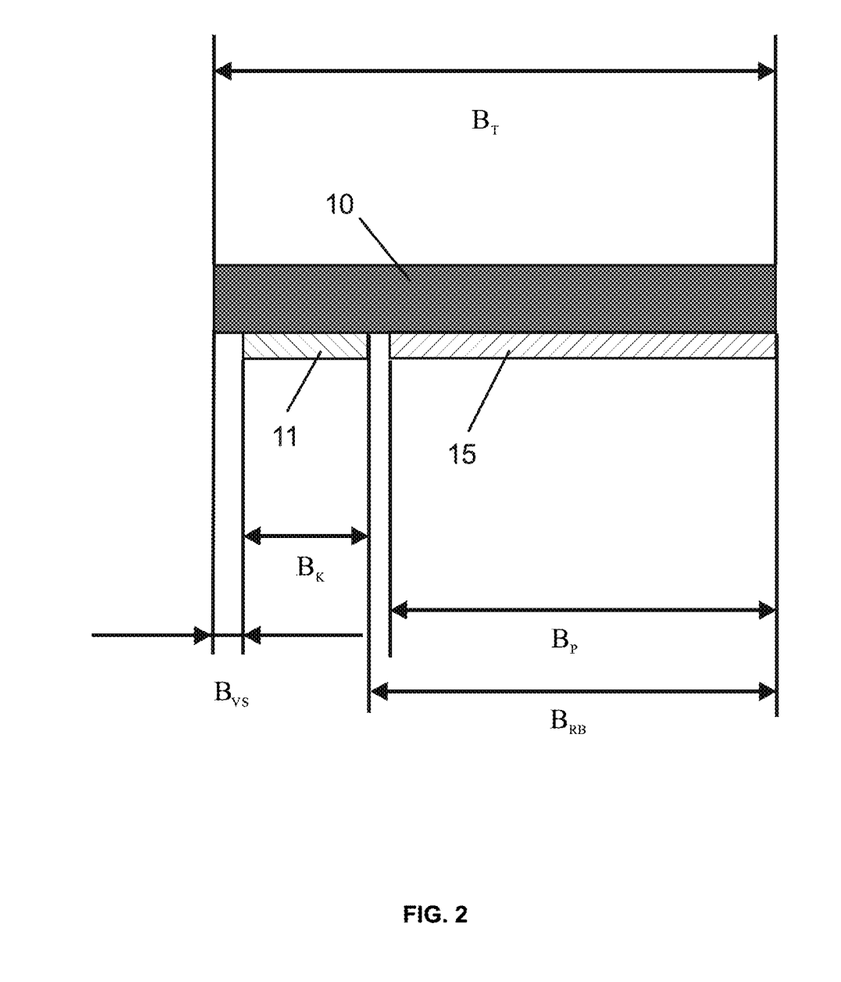
FIG. 2 shows an inventive adhesive tape with a strip of adhesive applied with an offset.

In contrast to the adhesive tape from FIG. 2, in which the strip is applied with an offset having a width $B_{VS}$, the adhesive strip 11 finishes flush with the long edge of the carrier 10.

Beside the strip 11 of adhesive on the bottom side of the carrier is a polymer strip 15, which extends over a width $B_P$ of 95% of the residual width $B_{RB}$, not coated with the strip 11 of adhesive, of the carrier; in other words, $B_P$ is not equal to $B_{RB}$.

Figure 3:
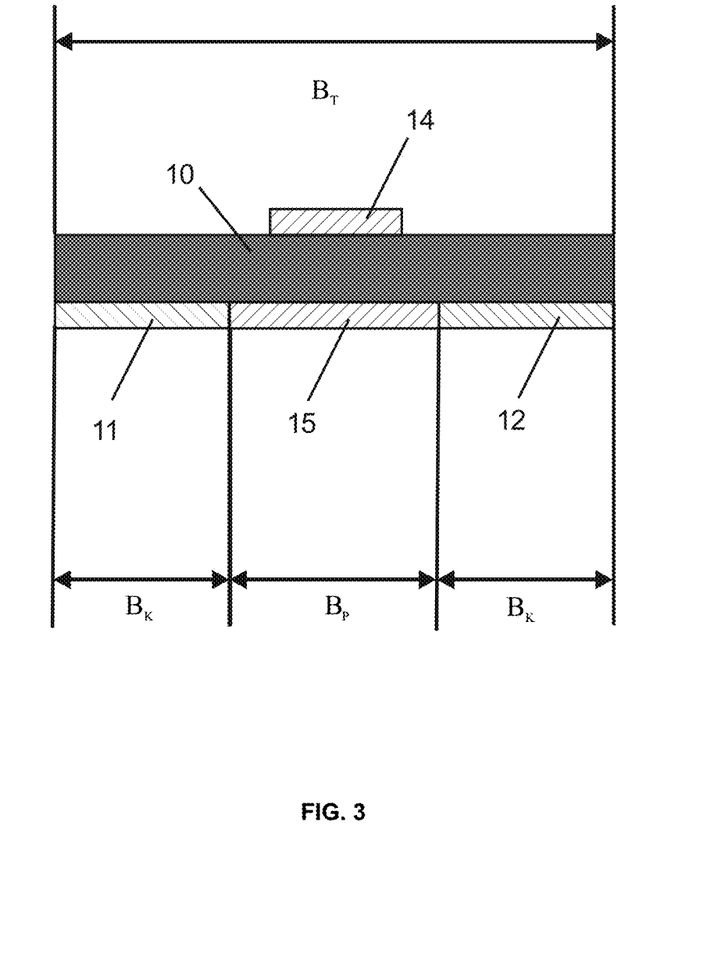
FIG. 3 shows a third inventive adhesive tape with two strips of adhesive.

FIG. 3 shows a third inventive adhesive tape, having two strips 11 and 12 of adhesive. On the bottom side of the carrier 10 there is a first strip 11 of adhesive and a second strip 12 of adhesive. The strips 11 and 12 of adhesive run in the longitudinal direction of the carrier 10, also called the machine direction, and both finish flush with the long edges of the carrier 10.

Between the strips 11 and 12 of adhesive on the bottom side of the carrier is a polymer strip 15, which extends over a width $B_P$ of 100% of the residual width $B_{RB}$, not coated with the strips 11 and 12 of adhesive, of the carrier; in other words, $B_P$ is equal to $B_{RB}$.

On the top side of the carrier 10 there is a third strip 14 of adhesive. The third adhesive strip 14, viewed in the cross section of the carrier 10, is in the region of the polymer strip 15 between the two strips 11 and 12 of adhesive on the bottom side of the carrier.

Figure 4:
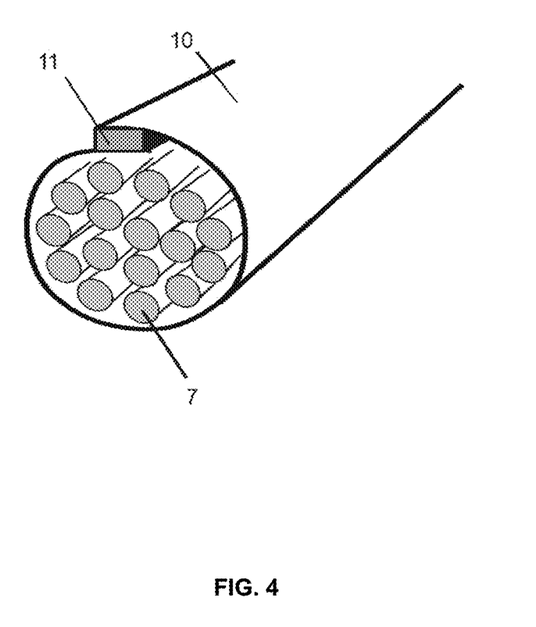
FIG. 4 shows the material jacketed with the inventive adhesive tape from FIG. 1.

FIG. 4 shows the material—here, cable 7 for a cable loom in the automotive segment—jacketed with the inventive adhesive tape from FIG. 1.

The cable 7 is enveloped by the adhesive tape in such a way that the adhesive strip 11 lies on the adhesive-strip-free end of the carrier 10.

Figure 5:
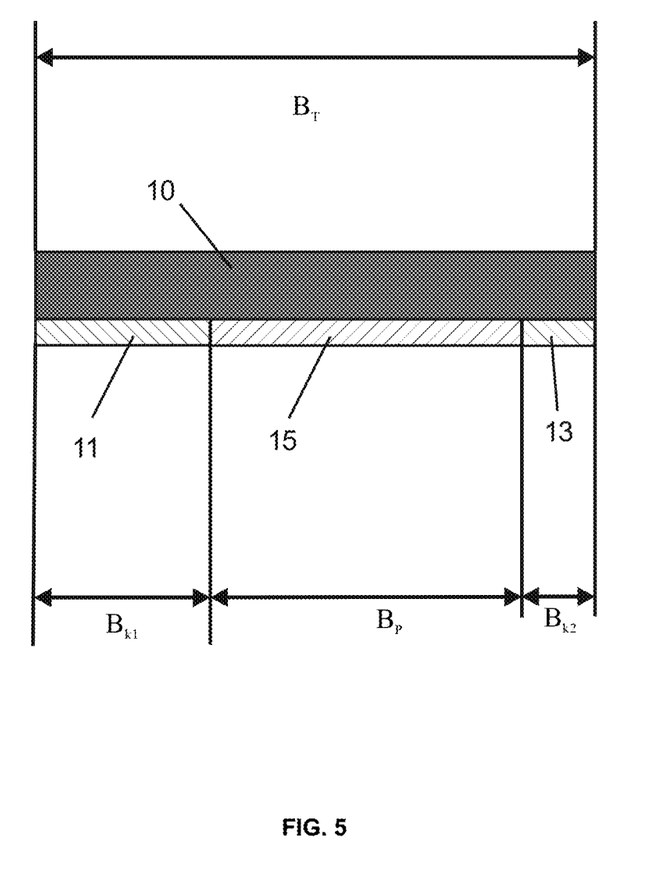
FIG. 5 shows a fourth inventive adhesive tape.

FIG. 5 shows a fourth inventive adhesive tape, having two strips 11 and 13 of adhesive. On the bottom side of the carrier 10 there is a first strip 11 of adhesive and a second strip 13 of adhesive, with the second strip 13 of adhesive having a lower width $B_{K2}$ than the first strip 11 of adhesive, which has a width $B_{K1}$.

The strips 11 and 13 of adhesive run in the longitudinal direction of the carrier 10, also called the machine direction, and both finish flush with the long edges of the carrier 10.

Between the strips 11 and 13 of adhesive on the bottom side of the carrier is a polymer strip 15, which extends over a width $B_P$ of 100% of the residual width $B_{RB}$, not coated with the strips 11 and 13 of adhesive, of the carrier; in other words, $B_P$ is equal to $B_{RB}$.

Before the invention is represented plastically by means of examples, a description is given of the measurement methods used.

Test Methods

The measurements are carried out—unless explicitly stated otherwise—under test conditions of 23±1° C. and 50±5% relative humidity.

Peel Strength (Peel Adhesion, PA)

For measurement of the peel adhesion forces, test strips 19 mm wide were adhered without bubbles to a finely sanded (emery paper with FEPA grit size 240) plate of stainless steel, and pressed down with a rubber-clad 2 kg roller at a speed of 10 m/min. The steel plate and the protruding end of the adhesive tape were then clamped into the ends of a tensile testing machine in such a way as to form a peel angle of 180°. After a predetermined time had been allowed to elapse for the bond to "take" (30 minutes unless otherwise indicated), the adhesive tape was peeled from the steel plate with a speed of 300 mm/min. The peel adhesion is reported in N/cm.

Static Glass Transition Temperature $T_g$

The static glass transition temperature is determined by dynamic scanning calorimetry in accordance with DIN 53765. The data for the glass transition temperature $T_g$ relates to the glass transformation temperature value $T_g$ in accordance with DIN 53765:1994-03, unless otherwise indicated in a particular case, and especially sections 7.1 and 8.1, although with uniform heating and cooling rates of 10 K/min in all heating and cooling steps (compare DIN 53 765; section 7.1; note 1).

Molecular Weights

The weight-average molecular weight $m_W$ is determined here by means of gel permeation chromatography (GPC). The eluent used is THF with 0.1 vol % of trifluoroacetic acid. Measurement takes place at 25° C. The pre-column used is PSS-SDV, 5μ, $10^3$ Å, ID 8.0 mm×50 mm. Separation is carried out using the columns PSS-SDV, 5μ, $10^3$ Å and also $10^5$ Å and $10^6$ Å each with ID 8.0 mm×300 mm. The sample concentration was 4 g/l, the flow rate 1.0 ml per minute. Measurement is made against PMMA standards. (μ=μm; 1 Å=$10^{-10}$ m).

Abrasion Resistance

The abrasion resistance is determined in accordance with LV312-1, likewise on the basis of a defined test method. The adhesive tapes are classified according to their abrasion resistance, for a mandrel diameter of 5 mm, as shown in Table 2:

For this purpose, the adhesive tape under test is first adhered to a mandrel or metal rod 5 mm in diameter. A scraper tool having a needle diameter of 0.45 mm is then used, on the basis of a weight force 7 N, to determine the number of strokes required to break right through the adhesive tape. The greater the number of strokes, the more abrasion-resistant the adhesive tape in question.

TABLE 2

| Abrasion resistance classification to LV 312-1 (10/2009) | |
|---|---|
| Abrasion class | Requirement |
| A no abrasion protection | <100 strokes |
| B low abrasion protection | 100-499 strokes |
| C moderate abrasion protection | 500-999 strokes |
| D high abrasion protection | 1000-4999 strokes |
| E very high abrasion protection | 5000-14999 strokes |
| F extremely high abrasion protection | ≥15000 strokes |

The examples which follow are intended to serve to illustrate the invention without wishing to limit it.

EXAMPLES

A total of six different adhesive tapes were produced. Example 1 is an adhesive tape without a polymer layer; Examples 2 to 6 each have a polymer layer, with a different polymer basis.

The carrier taken in each case was a plain-woven PET fabric 45 mm wide and of 130 g/m², its two long edges each bearing a strip of adhesive, applied flush, with a width of 10 mm.

Applied between the strips of adhesive was a polymer strip with a width of 25 mm, likewise with a coat weight of 70 g/m².

Carrier: 45 mm wide woven PET fabric, plain weave, 130 g/m²

Strips of adhesive: finishing flush with the long edge of the carrier
10 mm wide, 70 g/m² coat weight
acrylate-based adhesive Polymer strip: adjacent flush to the strips of adhesive; 25 mm wide, 70 g/m² coat weight
polymer basis various

| # | Coating type | Name | Coat weight [g/m²] | Abrasion resistance [No. of strokes] | Abrasion class LV312 |
|---|---|---|---|---|---|
| 1 | — | — | — | 286 | B |
| 2 | Acrylic latex | Acronal 500D | 70 | 812 | C |
| 3 | Natural rubber | SMR CV 50 | 70 | 490 | B |
| 4 | Natural rubber latex | Neotex FA | 70 | 348 | B |
| 5 | Synthetic rubber | Kraton D1101 AS | 70 | 793 | C |
| 6 | EPDM | Vistalon 6602 | 70 | 669 | C |

By means of the various polymer strips, the abrasion resistance is increased significantly by comparison with the bare carrier.

Furthermore, the rolls with polymer strips exhibit better winding characteristics, owing to the uniform thickness present over the entire width of the carrier. The wound rolls possess significantly cleaner edges and exhibit no gapping, in other words no holes or gaps within the coatings between the carrier plies within the roll of adhesive tape.

The invention claimed is:

1. Adhesive tape comprising a carrier having a top side and a bottom side, the carrier, based on the cross direction, having a width $B_T$,
    there being provided, on at least one long edge on the bottom side of the carrier, a strip of adhesive which has a width $B_K$ of at least 3 mm and at most 30% of the width $B_T$,
    wherein
    in addition to the strip of adhesive on the bottom side of the carrier, there is at least one polymer strip which extends over a width $B_P$ of at least 60% of a residual width $B_{RB}$ of the carrier, wherein said at least one polymer strip is not coated with the strip of adhesive, and wherein said at least one polymer strip has a thickness of 40 to 300 μm.

2. Adhesive tape according to claim 1,
    wherein
    there is provided, on each of both long edges on the bottom side of the carrier, a strip of adhesive, said strips having a width $B_K$ of at least 3 mm and of at most 30% of the width $B_T$,
    there being present, between the strips of adhesive on the bottom side of the carrier, at least one polymer strip which extends over a width $B_P$ of at least 60% of the residual width $B_{RB}$ of—not coated with the strip of adhesive—of the carrier.

3. Adhesive tape according to claim 1,
    wherein
    the strip or strips of adhesive each finish flush with the long edge or long edges of the carrier.

4. Adhesive tape according to claim 1,
    wherein
    the width $B_K$ of the strips of adhesive is at least 10 mm and/or at maximum at most 25% of the width $B_T$.

5. Adhesive tape according to claim 1, wherein the width $B_K$ of the strips of adhesive is between 5 and 40 mm.

6. Adhesive tape according to claim 1, wherein the width of one strip of adhesive $B_{K1}$ is smaller by a factor of 0.5 to 0.8 than the width of the other strip of adhesive $B_{K2}$.

7. Adhesive tape according to claim 1, wherein the strip or strips of adhesive have a thickness of 40 to 300 µm.

8. Adhesive tape according to claim 1, wherein the thickness or the coat weight of one strip of adhesive is smaller by a factor of 0.5 to 0.8 than the thickness or the coat weight of the other strip of adhesive.

9. Adhesive tape according to claim 1, wherein the width $B_T$ of the carrier is between 20 and 200 mm.

10. Adhesive tape according to claim 1, wherein the carrier has a basis weight of 30 to 250 g/m$^2$.

11. Adhesive tape according to claim 1, wherein the carrier used comprises a woven, nonwoven or knitted fabric.

12. A method for wrapping elongate material, said method comprising enveloping the elongate material in an axial direction by the adhesive tape according to claim 1.

13. Elongate material wrapped with an adhesive tape according to claim 1.

* * * * *